United States Patent

[11] 3,615,770

| [72] | Inventors | Marga Faulstich;<br>Neuroth Norbert, both of Mainz,<br>Momback, Germany |
|---|---|---|
| [21] | Appl. No. | 687,099 |
| [22] | Filed | Dec. 1, 1967 |
| [45] | Patented | Oct. 26, 1971 |
| [73] | Assignee | JENAer Glaswerk<br>Mainz, Germany |
| [32] | Priority | Dec. 7, 1966 |
| [33] | | Germany |
| [31] | | J 32423 |

[54] GLASS HAVING A LOW ULTRASONIC PROPAGATION TIME TEMPERATURE COEFFICIENT
9 Claims, No Drawings

[52] U.S. Cl. .................................................. 106/53,
106/52, 106/54, 333/30
[51] Int. Cl. ........................................................ C03c 3/04
[50] Field of Search ........................................... 106/53, 52,
54, 50; 333/29, 33, 30

[56] References Cited
UNITED STATES PATENTS

| 2,664,359 | 12/1953 | Dingledy | 106/50 |
| 2,727,214 | 12/1955 | McSkimin | 333/30 |
| 2,799,590 | 7/1957 | Armistead | 106/53 |
| 3,154,425 | 10/1964 | Hoover et al. | 106/53 |
| 3,173,780 | 3/1965 | Hoover | 106/53 X |
| 3,475,704 | 10/1969 | Van Der Burgt | 333/30 |

OTHER REFERENCES

Hamilton, E. H. et al., Properties of Sodium Titanian Silicate Glasses, in Journ. of Res. N. B. S., 61, 1958, pp. 89–94, Q1N65

*Primary Examiner*—Helen M. McCarthy
*Assistant Examiner*—W. R. Satterfield
*Attorney*—Burgess, Dinklage & Sprung ABSTRACT: A glass having a low ultrasonic wave propagation time temperature coefficient, preferably for transverse waves of about 4 MHz. is disclosed having the following composition in weight percent:

| $SiO_2 + B_2O_3$ | 65–83 |
| $(B_2O_3)$ | 0–3 |
| Alkali oxides | 9–20 |
| $TiO_2$ | 2–6 |
| $TiO_2 + PbO$ | 5–22 |
| $As_2O_3$ and/or $Sb_2O_3$ | 0.3–1.5 |

The glass is particularly adapted for use as a delay line, i.e., a means to retard the propagation of signal between two points.

GLASS HAVING A LOW ULTRASONIC PROPAGATION TIME TEMPERATURE COEFFICIENT

This invention relates to a glass having a low ultrasonic wave propagation time temperature coefficient. More particularly this invention relates to a glass having a low ultrasonic propagation time temperature coefficient and intended for use in connection with transverse waves of approximately 4 MHz.

The use of delay lines to retard the propagation of a signal between two points is known. It is also known that glass can be used as a material in fabricating such delay lines. An electrical signal, whose propagation speed in copper wire is about equal to the speed of light is transformed into mechanical vibrations and propagated through a glass rod (delay line). Its rate of propagation is thereby made equal to that of sound passing through a solid medium, which is of course much slower. At the other end of the glass rod, a transducer converts the mechanical vibrations (ultrasonic) back into an electrical alternating current.

Depending on the chemical composition of the glass rod used, delays of 2.7 to 4.6 microseconds per centimeter of propagation length can be obtained if transverse sound waves are produced. Delay lines have been developed for use in microwave application which provide delays of as much as several milliseconds.

Recently an important additional requirement has had to be met by delay lines intended for certain applications in color television reception and in computers. This requirement is that their propagation time must be constant over a fairly large temperature range. For example, for the receivers of color television based on the PAL system, it is required that the relative change in propagation time $(1/z)(dz/dT)$, be less than $2 \cdot 10^{16}$ per degree centigrade over a temperature range of about 10° to 60° C. This requirement is a very high one, if it is taken into consideration that the relative change in propagation time in glass and in other materials has a value on the order of $1 \times 10^{14}$ per degree Centigrade.

The propagation time $z$ of sound waves through a glass body having outside dimensions which are large in comparison to the wavelength is given by $z = l/v_t$, wherein $l$ is the length of the travel of the sound in the glass body and $v_t$ is the velocity of the transverse sound waves. $v_t$, in turn, is equal to $\sqrt{\dfrac{G}{\delta}}$, wherein G represents the torsional modulus and $\rho$ the density of the glass.

As the temperature T changes, both the length $l$ and the sound velocity $v_t$ change, and the relative change in the propagation time $(1/z)(dz/dT)$ is equal to $$\frac{1}{l}\frac{dl}{dT} - \frac{1}{v_t}\frac{dv_t}{dT} = \alpha - \beta.$$

Therefore it becomes minimal whenever the temperature coefficient of the transverse sound velocity $\beta$ is equal to the coefficient of thermal expansion $\alpha$. This equilibrium between the two magnitudes, however, can be obtained only over a certain temperature range.

The primary object of the invention is to provide a glass suitable for ultrasonic delay lines having a small propagation time temperature coefficient for ultrasonic waves.

It is a further object of the present invention to provide a glass suitable for ultrasonic delay lines having a small propagation time temperature coefficient for ultrasonic waves and which other objects and features of this invention will be apparent from the following description.

In accordance with the invention it has now been found that glasses suitable for ultrasonic delay lines and having the above properties are obtained with a glass having the following composition:

| | | |
|---|---|---|
| $SiO_2 + B_2O_3$ | 75–85 mole-% | 65–85 wt.-% |
| $B_2O_3$ amounting to | 0–4 mole-% | 0–3 wt.-% |
| Alkali oxides | 8–14 mole-% | 9.0–20 wt.-% |
| $TiO_2$ | 1.5–5.0 mole-% | 2.0–6.0 wt.-% |
| $TiO_2 + PbO$ | 4–8.5 mole-% | 5.0–22.0 wt.-% |
| $As_2O_3$ and/or $Sb_2O_3$ | 0.1–0.3 mole-% | 0.3–1.5 wt.-% |

The use of glass having the above composition results in that the propagation time characteristic passes through a minimum somewhere between −20° C. and 75° C. and that the variation in the delay time within the range between 20° below and 20° above this minimum propagation time amounts to less than $8 \times 10^{15}$.

It has furthermore been found in accordance with the invention that, in order for the minimum of the propagation time to be produced in the range of 10° C. of room temperature, it is important that the quantity of $Li_2O$ amount to from 0 to 2 wt.-%, the quantity of $Na_2O$ amount to from 0 to 12 wt.-%, and the $K_2O$ quantity amount to between 0 and 20 wt.-%, and that the quotient of $$\frac{\Sigma \text{ alkali oxide in mole—percent}}{TiO_2 \text{ in mole—percent}}$$

be between 3.0 and 5.5.

It has furthermore been found to be particularly advantageous for the total of the $TiO_2$ and PbO present to amount to between 4 and 8.5 mole-%, the $TiO_2$ content amounting to between 1.5 and 5 mole-% and the PbO content amounting to between 0 and 6 mole-%.

In the table which follows, examples of compositions in accordance with the invention in percent by weight are set out as illustrating glasses according to the invention.

These glasses have a minimum in their propagation time characteristic in the vicinity of room temperature, while at the same time the temperature-dependence curve is very flat. In addition to the chemical composition the table includes information on the coefficients of expansion ($\alpha$), the transformation temperature (Tg), the specific gravity (s), the temperature minimum of the propagation time ($T_o$), and the maximum relative variation of the propagation time $\Delta z/z$ between $T_o − 20$° C. and $T_o + 20$° C.

In order to compensate for the devitrification tendency of the glass compositions according to the invention, it is advantageous to add up to 2 percent by weight of alkaline earth oxides, CdO, ZnO, $Al_2O_3$, $ZrO_2$ and $WO_3$, the total not to exceed 5 percent by weight. Such addition while decreasing the devitrification tendency does not have any considerable effect on the temperature stability of the propagation time. In order to achieve a high constancy in the propagation time, it is important to cool the glasses slowly, i.e., at rates of 1.0° C./hr. to 0.5° C./hr. because this minimizes the after effects. The advantages of the glasses in accordance with the invention over glasses having a higher lead content are the lower thermal expansion, the higher transformation temperature, and the lower specific gravity. The first two qualities are favorable for the welding on of the ceramic transducers, and the last contributes to low weight in the electronic component.

The following example is given in order to illustrate more clearly the method of preparing a glass in accordance with the invention:

A batch mixture consisting of

| Oxides | Wt.-% | Raw Materials | For a 100-liter batch |
|---|---|---|---|
| $SiO_2$ | 74.7 | $SiO_2$ | 209.58 kg. |
| $K_2O$ | 19.9 | $K_2CO_3$ | 44.82 kg. |
| | | $KNO_3$ | 54.13 kg. |
| $TiO_2$ | 5.0 | $TiO_2$ | 14.04 kg. |
| $Sb_2O_3$ | 0.4 | $Sb_2O_3$ | 1.13 kg. | was thoroughly mixed in a conventional mixer, fused in an ordinary crucible at about 1,400°–1,420° C, and then fined at 1,450° C. The melting time and the fining time were governed entirely by the volume of the batch. For a 100-liter batch, the melting time amounted to 16 hours and the fining time to 14 hours. The resulting glass could be cast at a temperature between 1,330° and 1,300° C. This composition was suitable not only for pot melting but also for continuous tank production, either of which can be carried out entirely by the procedures conventionally employed.

TABLE

*Compositions in Percent by Weight*

| Oxides | 1 | 2 | 3 | 4 | 5 | 6 | 7 |
|---|---|---|---|---|---|---|---|
| $SiO_2$ | 74.7 | 82.5 | 80.2 | 76.9 | 66.3 | 66.4 | 68.4 |
| $B_2O_3$ | | | | | 2.0 | 2.0 | |
| $Li_2O$ | | | 1.5 | | | | |
| $Na_2O$ | | 12.0 | 9.6 | 10.8 | 7.5 | 7.5 | 7.5 |
| $K_2O$ | 19.9 | | | | 2.6 | 2.5 | 2.6 |
| ZnO | | | | | | 1.0 | |
| PbO | | | 4.0 | 7.9 | 18.4 | 15.2 | 18.5 |
| $Al_2O_3$ | | | | | | 1.0 | |
| $TiO_2$ | 5.0 | 5.0 | 4.2 | 3.6 | 2.7 | 3.0 | 2.7 |
| $ZrO_2$ | | | | | | 1.1 | |
| $As_2O_3$ | | | | | 0.5 | 0.3 | 0.3 |
| $Sb_2O_3$ | 0.4 | 0.5 | 0.5 | 0.8 | | | |
| $\alpha \cdot 10^7$ (−30−+70°C) | 77.3 | 56.8 | 58.6 | 59.5 | 65.2 | 61.3 | 71.2 |
| $Tg$ °C | 573 | 538 | 475 | 508 | 514 | 529 | 490 |
| $s$ | 2.40 | 2.38 | 2.45 | 2.53 | 2.79 | 2.73 | 2.77 |
| $T_0$ °C | 65 | 55 | 40 | 75 | 42 | 18 | 30 |
| $\frac{\Delta z}{z}$ between $T_0-20°C$ / $T_0+20°C$ | $1.5 \cdot 10^{-5}$ | $1.6 \cdot 10^{-5}$ | $6.2 \cdot 10^{-5}$ | $6.2 \cdot 10^{-5}$ | $4.7 \cdot 10^{-5}$ | $3.9 \cdot 10^{-5}$ | $6.2 \cdot 10^{-5}$ | oxide content amounts to 8–14 mole-%, as follows: the $Li_2O$ content amounts to 0–4 mole-%, the $Na_2O$ content amounts to 0–12 mole-% and the $K_2O$ content amounts to 0–14 mole-%.

6. A glass according to claim 1 having the following composition:

| | | |
|---|---|---|
| $SiO_2$ | 81.9 mole-% | 74.7 wt.-% |
| $K_2O$ | 13.9 mole-% | 19.9 wt.-% |
| $TiO_2$ | 4.1 mole-% | 5.0 wt.-% |
| $Sb_2O_3$ | 0.1 mole-% | 0.4 wt.-%. |

7. A glass according to claim 1 having the following composition:

| | | |
|---|---|---|
| $SiO_2$ | 78.9 mole-% | 66.3 wt.-% |
| $B_2O_3$ | 2.0 mole-% | 2.0 wt.-% |
| $Na_2O$ | 8.6 mole-% | 7.5 wt.-% |
| $K_2O$ | 2.0 mole-% | 2.6 wt.-% |
| PbO | 5.9 mole-% | 18.4 wt.-% |
| $TiO_2$ | 2.4 mole-% | 2.7 wt.-% |
| $As_2O_3$ | 0.2 mole-% | 0.5 wt.-%. |

8. A glass according to claim 1, having the following composition:

| | | |
|---|---|---|
| $SiO_2$ | 77.9 mole-% | 66.4 wt.-% |
| $B_2O_3$ | 2.0 mole-% | 2.0 wt.-% |
| $Na_2O_3$ | 8.5 mole-% | 7.5 wt.-% |
| $K_2O$ | 1.9 mole-% | 2.5 wt.-% |
| ZnO | 0.9 mole-% | 1.0 wt.-% |
| PbO | 4.8 mole-% | 15.2 wt.-% |
| $Al_2O_3$ | 0.7 mole-% | 1.0 wt.-% |
| $TiO_2$ | | 2.6 wt.-% | 3.0 wt.-% |
| $ZrO_2$ | 0.6 mole-% | 1.1 wt.-% |
| $Sb_2O_3$ | 0.1 mole-% | 0.3 wt.-% |

9. A glass according to claim 1 having the following composition:

| | |
|---|---|
| $SiO_2$ | 82.5 wt.-% |
| $Na_2O$ | 12.0 wt.-% |
| $TiO_2$ | 5.0 wt.-% |
| $Sb_2O_3$ | 0.5 wt.-%. |

We claim:
1. A glass having an ultrasonic wave propagation time-temperature coefficient $(z)(dz/dt)$ minimum at a temperature $(I_0)$ in the range of about −20 to 75°C., and a variation $dz/z$ in said coefficient in the temperature range of $T_0$−20°C. to $T_0$+20°C. of less than $8 \times 10^{15}$, consisting essentially of:

| | Mole-% | Wt.-% |
|---|---|---|
| $SiO_2+B_2O_3$ | 75–85 | 65–83 |
| $B_2O_3$ amounting to | 0–4 | 0–3 |
| Alkali metal oxides | 8–14 | 9–20 |
| $TiO_2$ | 1.5–5.0 | 2–6 |
| $TiO_2+PbO$ | 4–8.5 | 5–22 |
| $As_2O_3$ and/or $Sb_2O_3$ | 0.1–0.3 | 0.3–1.5 |
| PbO | 0–6 | 0–18.5 | wherein the ratio $$\frac{\text{alkali metal oxide mole—percent}}{TiO_2 \text{ mole—percent}}$$

is from 3.0–5.5.

2. A glass according to claim 1, containing as additional ingredients up to 2 percent by weight of the alkaline earth oxides, CdO, ZnO, $Al_2O_3$, ZrO, and $WO_3$, the total of said additional ingredients not exceeding 5 wt.%.

3. A glass according to claim 1, the thermal expansion coefficient for −30° to +70° C. times $10^7$ being 56.8–77.3; the transformation temperature being 475°–573° C.; and the specific gravity being 2.38–2.79.

4. A glass according to claim 2, the thermal expansion coefficient for −30° to +70° C times $10^7$ being 56.8–77.3; the transformation temperature being 475°–573° C.; and the specific gravity being 2.38–2.79.

5. A glass according to claim 1, wherein said alkali metal

PO-1050
(5/69)

UNITED STATES PATENT OFFICE
CERTIFICATE OF CORRECTION

Patent No. 3,615,770      Dated Oct. 26, 1971

Inventor(s) Marga Faulstich et al.

It is certified that error appears in the above-identified patent and that said Letters Patent are hereby corrected as shown below:

Col. 1, line 37, change "$1 \times 10^{14}$" to -- $1 \times 10^{-4}$ --;

Col. 1, line 71, (3rd col.) change "65-85 wt.-%" to -- 65-83 wt-% --.

Col. 3, line 31, change "(z) (dz/dt)" to -- $\frac{1}{z}\frac{dz}{dt}$ -- and on the same line change "($1_o$)" to -- ($T_o$) --.

Signed and sealed this 25th day of April 1972.

(SEAL)
Attest:

EDWARD M. FLETCHER, JR.
Attesting Officer

ROBERT GOTTSCHALK
Commissioner of Patents